United States Patent
Gandham et al.

(10) Patent No.: US 8,125,951 B2
(45) Date of Patent: Feb. 28, 2012

(54) NETWORK ENTRY PROCEDURE IN MULTI-CHANNEL MOBILE NETWORKS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 344 days.

(21) Appl. No.: 12/653,007

(22) Filed: Dec. 7, 2009

(65) Prior Publication Data

US 2010/0150095 A1    Jun. 17, 2010

Related U.S. Application Data

(60) Provisional application No. 61/201,162, filed on Dec. 8, 2008.

(51) Int. Cl.
*H04W 4/00*    (2009.01)
(52) U.S. Cl. ..................................... 370/329
(58) Field of Classification Search ........................ None
See application file for complete search history.

(56) References Cited

U.S. PATENT DOCUMENTS

| | | | |
|---|---|---|---|
| 5,926,469 A | 7/1999 | Norstedt et al. | |
| 7,504,941 B1 * | 3/2009 | Taskin et al. | 370/401 |
| 7,565,109 B2 * | 7/2009 | Morioka et al. | 455/63.1 |
| 7,925,269 B2 * | 4/2011 | Shao et al. | 455/450 |
| 8,031,737 B2 * | 10/2011 | Jeon et al. | 370/437 |
| 2006/0116118 A1 | 6/2006 | Charriere et al. | |
| 2006/0205349 A1 * | 9/2006 | Passier et al. | 455/41.2 |
| 2008/0051036 A1 | 2/2008 | Vaswani et al. | |
| 2008/0064399 A1 | 3/2008 | Lin | |
| 2008/0280615 A1 | 11/2008 | Vinayakray-Jani | |
| 2009/0310514 A1 * | 12/2009 | Jeon et al. | 370/254 |
| 2010/0304772 A1 * | 12/2010 | Wang et al. | 455/509 |

* cited by examiner

*Primary Examiner* — Hassan Phillips
*Assistant Examiner* — Prenell Jones
(74) *Attorney, Agent, or Firm* — Dennis L. Cook, Esq.

(57) ABSTRACT

A technique for network entry in multi-channel mobile systems is described. The procedure utilizes the channel specific information sent in the beacon of each channel to select a subset of suitable channels. It then proceeds to scan these channels to gather information on perceived interference and received signal strength. Based on collected information the device picks the most suitable channel for joining the network. Since the channels to be scanned are pre-selected based on information seen in the beacon, the overall scan latency is reduced, thereby leading to a faster and more successful network entry.

2 Claims, 3 Drawing Sheets

NETWORK ENTRY PROCEDURE IN MULTI-CHANNEL MOBILE NETWORKS

CROSS-REFERENCE TO RELATED APPLICATION

The present application claims the benefit of previously filed Provisional Patent Application Ser. No. 61/201,162.

FIELD OF THE INVENTION

This invention addresses the need to transport high bit-rate data and voice to multiple users over wired and wireless means. In wireless networks where multiple base stations are deployed, handsets need a network entry procedure. In this disclosure a network entry procedure to select the most suitable network and channel in the vicinity of the mobile is described. More specifically a system and method of network entry that takes into account channel specific information provided by the base station and local information collected through channel scans to select the best possible network is disclosed.

BACKGROUND OF THE INVENTION

The invention disclosed in this application uses any type modulation and more particularly works with a method of modulation now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this system and method of network entry that takes into account channel specific information provided by the base station and local information collected through channel scans to select the best possible network as described herein is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069, 057; 12/070,0817; 12/380,698; 12/384,546; 12/386,648; 12,387,811; 12/387,807; 12/456,758; 12/456,725; 12/460, 497; 12/583,627; 12/583,644; 12/590,472; 12/590,469; 12/590,931, and 61/201,172 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a system and method of network entry that takes into account channel specific information provided by the base station and local information collected through channel scans to select the best possible network as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

Network entry procedure is an important design requirement in any cellular system. A mobile device should be capable of detecting and joining the most suitable network on the most suitable channel in its vicinity. A mechanism is proposed that takes into account channel specific information provided by the base station and local information collected through channel scans to select the best possible network. The overall latency associated with network entry is minimized as only the most suitable subset of available channels is scanned. The mechanism is presented with respect to multi-frequency xMAX system, it is however applicable to any cellular system.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
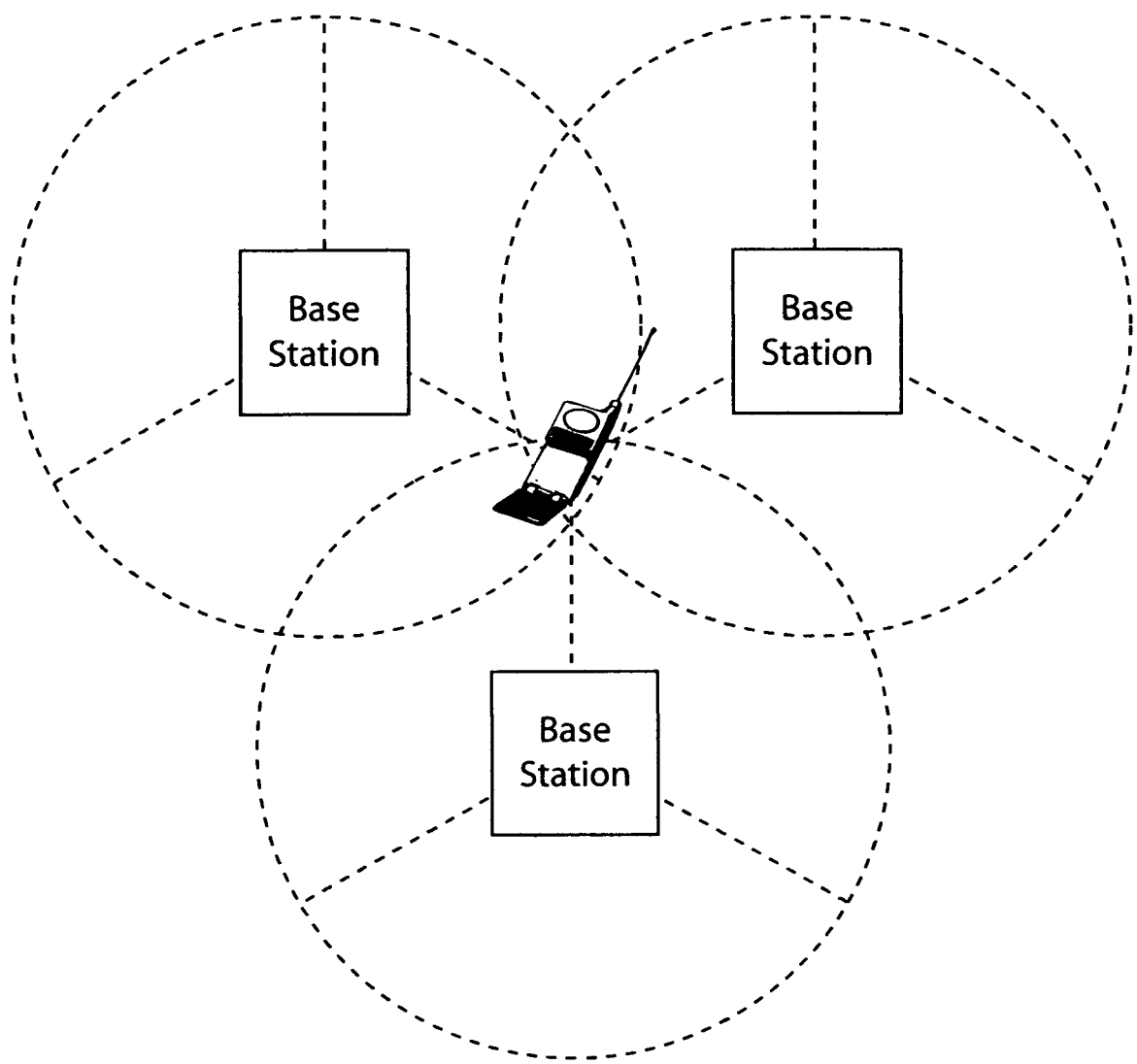
FIG. 1 is a diagram showing a multi-sector xMAX system.

A mobile device may be powered on in a region where it detects multiple channels from different sectors or cells. In such a scenario it must select the most promising channel out of all available options. In doing so it ensures a higher probability of successful call establishment and superior voice quality. The criteria for selecting a suitable channel may include perceived interference, received signal strength, available capacity on the given channel, etc.

The Multi-frequency xMAX system operates in the 900 MHz Industrial Scientific and Medical (ISM) band that ranges from 902 MHz to 928 MHz. xMAX splits the 26 MHz band into 18 1.44 MHz wide channels, each providing a maximum data rate of 1 Mbps. The center frequency of each channel (in MHz) is calculated using the following formula: $Fc_n(MHz)=902.72+1.44(n-1)$. A list of channels with their center frequencies is shown in the following table:

| Channel # | Center Frequency |
|---|---|
| 1 | 902.72 |
| 2 | 904.16 |
| 3 | 905.6 |
| 4 | 907.04 |
| 5 | 908.48 |
| 6 | 909.92 |

-continued

| Channel # | Center Frequency |
|---|---|
| 7 | 911.36 |
| 8 | 912.8 |
| 9 | 914.24 |
| 10 | 915.68 |
| 11 | 917.12 |
| 12 | 918.56 |
| 13 | 920 |
| 14 | 921.44 |
| 15 | 922.88 |
| 16 | 924.32 |
| 17 | 925.76 |
| 18 | 927.2 |

The coverage area of each cell is split into three 120-degree sectors, with a maximum of six channels servicing a sector. Each channel is split into multiple fixed duration timeslots that provide Uplink and Downlink data/Control paths to end user devices.

A typical xMAX system will consist of multiple Base Stations where each Base Station provides service to multiple end user devices. An end user device can be classified as:

Handset: such a device provides voice-only services. The handset is mobile and free to move within the cell without affecting the voice quality.

Data Modem: a data modem will pre-dominantly be used for data access.

Various other cellular technologies also employ network entry procedures. However, there are significant differences between these technologies and xMAX. A major difference between xMAX and other systems is the usage of the ISM band. All major cellular technologies operate on dedicated frequency bands, thus interference does not play a major role in selecting channels for network entry. For example, GSM uses an RSSI based selection mechanism where the base station with the strongest signal strength is selected. If such a solution is employed then an xMAX device might select a channel on which the base station's reception is impaired by interference. As a result the network join message sent by the device might never be received by the base station. The network entry procedure for xMAX explained in this invention disclosure is comparatively much more robust as it considers the interference encountered by the handset (downlink interference) and the base station (uplink interference) before making a decision. Another major difference is the time taken to discover, select and join a network. The xMAX network entry procedure is much faster as the handshake between handset and base station involves only two messages. In comparison, GSM and WiMax network entry requires multiple message exchanges before the procedure is completed. For instance, in WiMax the network entry procedure is preceded by a multi-stage ranging mechanism. In xMAX networks ranging is accomplished while the device sends a network join message.

Upon powering up all end user devices are expected to search for and join an xMAX network. Based on its location a device may be in a position to hear multiple channels that may or may not belong to the same sector or cell.

FIG. 1 depicts the scenario where a handset is in a position to listen to multiple sectors of different base stations and each sector would be allotted a set of channels. Due to fading and random interference some channels will be able to provide a better link quality than others. Thus, the handset should be able to scan each channel and pick one that provides the best link quality.

Each device is aware of the channels available in xMAX that it can operate on. Once the handset powers up it randomly selects a channel and initiates channel scan. The device will spend a fixed time period scanning one channel, after which it will select the next channel and repeat the procedure. During scanning the device tries to receive a Beacon that is transmitted at the beginning of each Super-frame. For more detailed information on super-frame structure and xMAX network architecture please refer to the patent applications listed above.

Each beacon contains channel specific information that allows the end user device to determine the usability of the channel. This information includes:

Interference Estimate: It is the estimate of interference observed on the uplink of a channel.

Residual Voice Capacity: it is the ratio of available voice timeslots to the total voice timeslots in a channel.

Residual Data Capacity: it is the ratio of available data timeslots to the total data timeslots in a channel.

Percentage of registered handsets: it is the ratio of the number of registered handsets to the maximum possible handset registrations.

Figure 2:
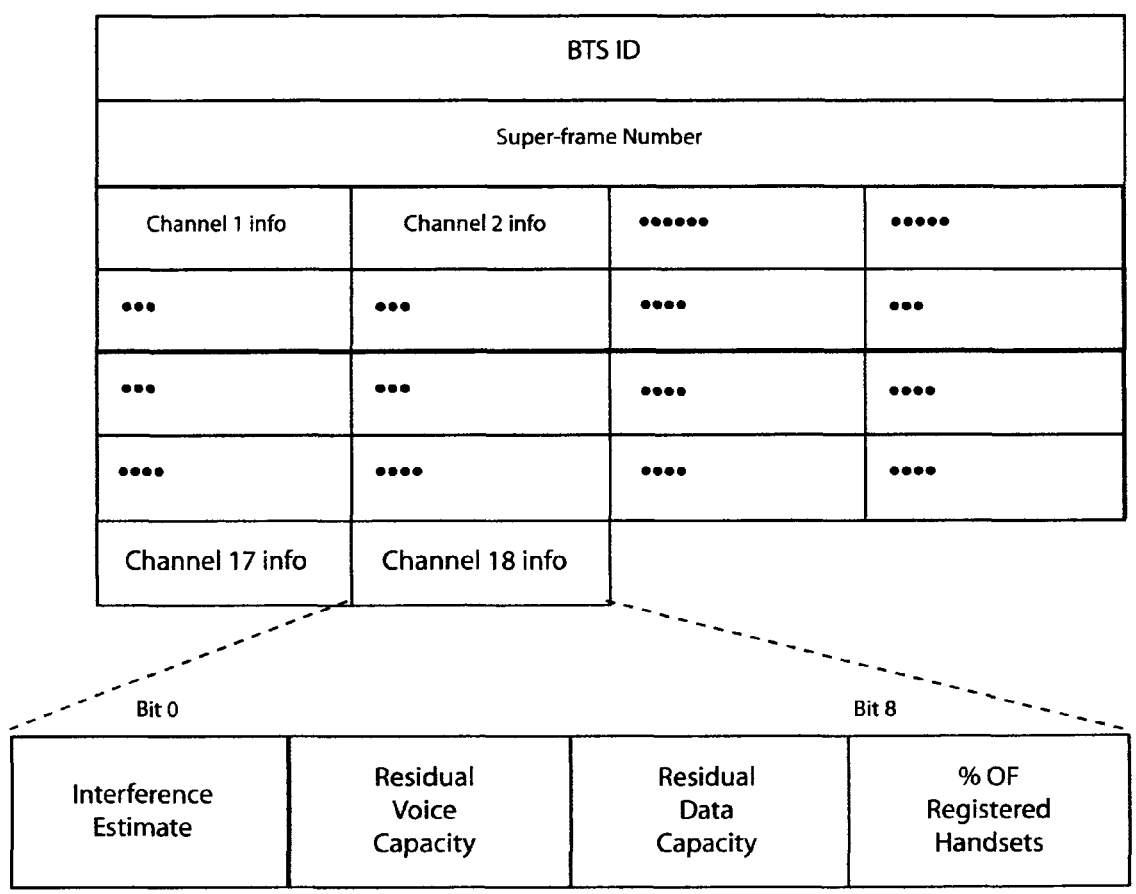
FIG. 2 is a diagram showing a Beacon structure.
Figure 3:
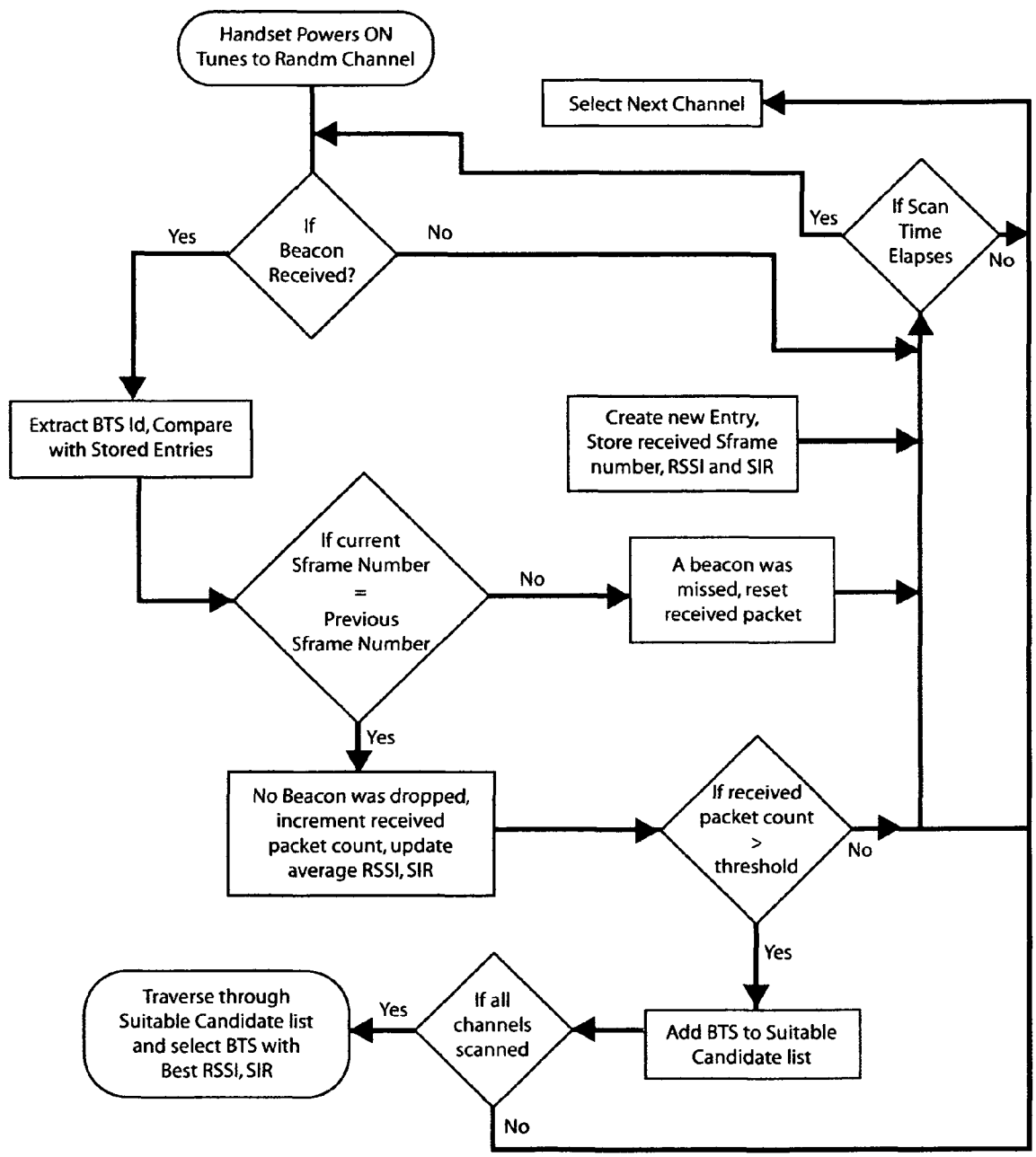
FIG. 3 is a flow chart showing logic flow for multi-channel network entry.

FIG. 2 depicts the structure of a typical beacon packet. For a more detailed explanation of beacon structure and its role in channel selection please refer to the patent applications listed above. The handset uses the above information to shortlist a set of suitable channels that will be scanned. Since it does not need to scan all channels, the delay involved in the Network entry process is reduced.

The handset maintains a data structure that stores information pertaining to the channels that were discovered during scanning. All information that was extracted from the beacon is inserted into the data structure.

Once the beacon is received the handset extracts the base station (BTS) ID and compares it with entries in the data structure. If no match is found it implies that this Base Station-Channel combination was detected for the first time and a new entry is created. If, however, a matching entry is found, all corresponding information is updated. If the received packet count for that base station exceeds a predefined threshold the BTS ID and the Channel ID is entered into a Suitable Candidate list. This list stores the information about all available (and suitable) channels that were scanned. An example of such a table is shown in the following table:

| Channel | BTS ID | RSSI (dBm) | Downlink interference | Uplink Interference | Residual capacity |
|---|---|---|---|---|---|
| 1 | 33344 | −70 | High | High | Low |
| 3 | 33344 | −78 | Low | Low | Low |
| 11 | 33344 | −81 | Low | Medium | Medium |
| 13 | 32155 | −76 | Medium | Low | Medium |
| 15 | 32156 | −82 | Low | Low | Low |

If a Base Station-Channel combination was successfully detected the handset moves to the next channel and repeats the procedure until all the channels are scanned. If nothing is detected on a given channel, and the timer expires, the handset will move to the next channel and try again. Once all the channels are scanned the handset picks the best possible channel from the Candidate list based on the average RSSI and SIR values. The handset will then extract all timing information from the beacon of the selected channel and synchronize with it. If the handset did not detect a BTS on any of the channels it will go to sleep for a random period of time and try again after waking up.

Thus, a technique for network entry in multi-channel xMAX system is described here. The procedure utilizes the channel specific information sent in the beacon of each channel to select a subset of suitable channels. It then proceeds to scan these channels to gather information on perceived interference and received signal strength. Based on collected information, the device picks the most suitable channel for joining the network. Since the channels to be scanned are pre-selected based on information seen in the beacon, the overall scan latency is reduced, thereby leading to a faster and more successful network entry.

Since certain changes may be made in the above described system and method for network entry in a multi-channel xMAX system without departing from the scope of the invention herein involved, it is intended that all matter contained in the description thereof, or shown in the accompanying figures, shall be interpreted as illustrative and not in a limiting sense.

What is claimed is:

1. A network entry system for mobile node handsets when entering a network for selecting between multiple channels of multiple base stations having a medium access control protocol used for forwarding Internet Protocol packets between multiple base stations and mobile nodes in voice over the Internet protocol systems on a wireless network comprising:

multiple base stations in electrical communication with the Internet;

one or more mobile nodes in wireless electrical communication with one of said multiple base stations said multiple base stations and said one or more mobile nodes each having a medium access control protocol;

each of said multiple base stations having multiple channels transmitting a beacon signal containing base station ID, interference estimate, residual voice capacity, residual data capacity, percentage of registered mobile nodes, and timing information;

said medium access control protocol having hyper-frames comprised of super-frames;

wherein when one of said one or more mobile nodes powers up said mobile node scans for a beacon signal for all channels available at a scan rate of once per super-frame for base station ID, interference estimate, residual voice capacity, residual data capacity, and percentage of registered mobile nodes from said beacons of each of said multiple base stations in mobile nodes' electrical communication range and said mobile node stores said base station ID, interference estimate, residual voice capacity, residual data capacity, and percentage of registered mobile nodes of said multiple base stations and said mobile node uses said stored base station ID, interference estimate, residual voice capacity, residual data capacity, and percentage of registered mobile nodes of said multiple base stations to determine a subset of said available channels to be scanned when said mobile node begins network entry; and, wherein when said mobile node begins network entry said mobile node scans said subset of available channels to select a channel with the best signal strength and interference estimate and said mobile node uses said stored timing information of said beacon of said selected channel to synchronize with said selected channel.

2. The network entry system for mobile node handsets for selecting between multiple channels of multiple base stations of claim 1 wherein if said handset did not detect any channels it will shut down for a period of time then restart and repeat scanning for said beacon signals.

* * * * *